(12) United States Patent  
Koudai et al.

(10) Patent No.: US 12,240,546 B2  
(45) Date of Patent: Mar. 4, 2025

(54) STEERING CONTROL DEVICE AND STANDARD VALUE ADJUSTMENT METHOD

(71) Applicants: JTEKT CORPORATION, Kariya (JP); TOYOTA JIDOSHA KABUSHIKI KAISHA, Toyota (JP)

(72) Inventors: Takashi Koudai, Okazaki (JP); Yuji Fujita, Okazaki (JP); Yugo Nagashima, Anjo (JP); Kazuma Hasegawa, Anjo (JP); Yuuta Kajisawa, Okazaki (JP); Shintaro Takayama, Toyota (JP); Hiroyuki Katayama, Toyota (JP); Yosuke Yamashita, Nagoya (JP); Masaharu Yamashita, Toyota (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 170 days.

(21) Appl. No.: 18/156,826

(22) Filed: Jan. 19, 2023

(65) Prior Publication Data

US 2023/0234639 A1    Jul. 27, 2023

(30) Foreign Application Priority Data

Jan. 26, 2022    (JP) .................................. 2022-010238

(51) Int. Cl.
*B62D 6/00* (2006.01)
*B62D 1/04* (2006.01)
(Continued)

(52) U.S. Cl.
CPC ............. *B62D 6/002* (2013.01); *B62D 5/006* (2013.01); *B62D 6/008* (2013.01); *B62D 1/04* (2013.01); *B62D 5/0409* (2013.01)

(58) Field of Classification Search
CPC ........ B62D 6/002; B62D 5/006; B62D 6/008; B62D 1/04; B62D 5/0409; B62D 15/0245;
(Continued)

(56) References Cited

U.S. PATENT DOCUMENTS 4,803,629 A * 2/1989 Noto .................. B62D 15/0245  
 701/41  
4,961,474 A * 10/1990 Daido ................ B62D 15/0245  
 701/41

(Continued)

FOREIGN PATENT DOCUMENTS

DE         103 45 303 A1     4/2005  
DE   10 2007 019 739 A1    10/2008  
(Continued)

OTHER PUBLICATIONS

Screen captures from YouTube video clip entitled "Steering Angle Reset on Honda Accord With Autel Scanner", uploaded on Jan. 23, 2020 by user "The Modern Mechanic". Retrieved from Internet; URL: https://www.youtube.com/watch?v=3N3envWk8xA. (Year: 2020).*

(Continued)

*Primary Examiner* — Phutthiwat Wongwian  
*Assistant Examiner* — Brian R Kirby  
(74) *Attorney, Agent, or Firm* — Oliff PLC

(57) ABSTRACT

A steering control device includes a control unit. The control unit is configured to execute a control angle calculation process, an angle feedback process, and a standard value adjustment process. The control angle calculation process is a process of calculating a control angle as an absolute angle relative to a standard value, and the angle feedback process is a process of performing feedback control on the control angle, and the standard value adjustment process is a process (Continued)

of adjusting the stored standard value. The standard value adjustment process includes a process of, when, in a straight-ahead state, the control angle deviates from a value showing the straight-ahead state, adjusting the standard value such that the deviation of the control angle from the value showing the straight-ahead state decreases.

5 Claims, 8 Drawing Sheets

(51) Int. Cl.
  *B62D 5/00* (2006.01)
  *B62D 5/04* (2006.01)
(58) Field of Classification Search
  CPC .. B62D 15/024; B62D 5/0457; B62D 5/0481; B62D 6/00; B62D 5/0463
  USPC ............................................... 701/41, 42, 43
  See application file for complete search history.

(56) References Cited

U.S. PATENT DOCUMENTS

| | | | | |
|---|---|---|---|---|
| 5,032,996 | A * | 7/1991 | Shiraishi | B62D 15/02 701/41 |
| 5,253,172 | A * | 10/1993 | Ito | B60T 8/172 701/41 |
| 5,311,432 | A * | 5/1994 | Momose | B62D 15/0245 701/41 |
| 5,465,210 | A * | 11/1995 | Walenty | B62D 15/0245 701/1 |
| 5,992,558 | A * | 11/1999 | Noro | B62D 6/007 701/41 |
| 6,144,908 | A * | 11/2000 | Yasuda | B62D 15/02 701/41 |
| 8,504,243 | B2 * | 8/2013 | Kageyama | B62D 5/008 701/72 |
| 2004/0061500 | A1 * | 4/2004 | Lou | B62D 15/0245 324/332 |
| 2006/0041358 | A1 * | 2/2006 | Hara | B62D 15/0245 701/41 |
| 2006/0085113 | A1 * | 4/2006 | Tamaizumi | B62D 5/0463 701/41 |
| 2006/0293818 | A1 * | 12/2006 | Lu | B62D 15/0235 701/41 |
| 2008/0119986 | A1 * | 5/2008 | Wei | B62D 15/0245 701/41 |
| 2011/0029200 | A1 * | 2/2011 | Shah | B62D 6/04 701/41 |
| 2011/0106382 | A1 * | 5/2011 | Kageyama | B62D 6/04 701/42 |
| 2012/0041658 | A1 * | 2/2012 | Turner | B62D 15/0245 701/1 |
| 2013/0332030 | A1 * | 12/2013 | Koukes | B60W 10/20 701/41 |
| 2017/0029022 | A1 * | 2/2017 | Nakamura | B62D 5/0487 |
| 2017/0355397 | A1 * | 12/2017 | Watanabe | B62D 6/003 |
| 2020/0114953 | A1 * | 4/2020 | Naik | B62D 6/002 |
| 2020/0283059 | A1 * | 9/2020 | Kodera | B62D 6/008 |
| 2021/0016830 | A1 * | 1/2021 | Riese | B62D 6/008 |
| 2022/0315105 | A1 * | 10/2022 | Kuragaki | B62D 15/025 |

FOREIGN PATENT DOCUMENTS

| | | |
|---|---|---|
| JP | 2020-142596 A | 9/2020 |
| WO | 2021/065714 A1 | 4/2021 |

OTHER PUBLICATIONS

Steering Angle Reset Procedure (Year: 2020).*
Jun. 15, 2023 Search Report issued in European Patent Application No. 23153252.4.

* cited by examiner

STEERING CONTROL DEVICE AND STANDARD VALUE ADJUSTMENT METHOD

CROSS-REFERENCE TO RELATED APPLICATION

This application claims priority to Japanese Patent Application No. 2022-010238 filed on Jan. 26, 2022, incorporated herein by reference in its entirety.

BACKGROUND

1. Technical Field

The present disclosure relates to a steering control device and a standard value adjustment method.

2. Description of Related Art

For example, the steering device described in Japanese Unexamined Patent Application Publication No. 2020-142596 (JP 2020-142596 A) has been proposed as a steering device installed in a vehicle. The steering device described in JP 2020-142596 A is a so-called steer-by-wire steering device in which a power transmission path between a steering wheel of the vehicle and turning wheels of the vehicle is cut off. The steering device described in JP 2020-142596 A includes a steering unit and a turning unit. The steering unit includes a steering-side actuator that operates to apply a steering reaction force to the steering wheel. The turning unit includes a turning-side actuator that operates to turn the turning wheels.

SUMMARY

When controlling the operation of the turning unit, the steering device described in JP 2020-142596 A performs, for example, feedback control using a turning-associated angle as a control angle so as to turn the turning wheels to a target turning state. The turning-associated angle is angle information showing a turning state of the turning wheels and is specified as an absolute angle relative to a defined standard value. The standard value is a value associated with a neutral position that is a mechanical state of the turning unit showing a straight-ahead state of the turning wheels. The standard value is set, for example, during the work of assembling the turning unit at a factory etc. In some cases, the standard value is set during the work of assembling the turning unit as a value that deviates from the neutral position showing the straight-ahead state of the turning wheels. In this case, even when the turning wheels are in the straight-ahead state, the turning-associated angle deviates from the value showing the straight-ahead state. This can cause a decrease in the effect of performing feedback control on the turning-associated angle. Such a problem can arise not only in steer-by-wire steering devices but also in steering devices as well that perform feedback control using, as the control angle, angle information showing a turning state of the turning wheels.

A first aspect of the present disclosure is a steering control device. The steering control device controls, as a target, a steering device including a turning unit that operates to turn a turning wheel of a vehicle. The steering control device includes a control unit that stores a standard value and controls operation of the turning unit. The standard value is a value associated with a mechanical state of the turning unit showing a straight-ahead state that is a turning state of the turning wheel when the vehicle moves straight ahead. The control unit is configured to execute a control angle calculation process, an angle feedback process, and a standard value adjustment process. The control angle calculation process is a process of calculating, as an absolute angle relative to the standard value, a control angle that is angle information showing an actual turning state of the turning wheel, and the angle feedback process is a process of performing feedback control on the control angle so as to turn the turning wheel to a target turning state, and the standard value adjustment process is a process of adjusting the stored standard value on the condition that a diagnostic state for diagnosing an abnormal state of the vehicle is present. The standard value adjustment process includes a process of, when, in the straight-ahead state, the control angle deviates from a value showing the straight-ahead state, adjusting the standard value such that the deviation of the control angle from the value showing the straight-ahead state decreases.

According to this configuration, for example, when the standard value deviates from the value associated with the mechanical state of the turning unit showing the straight-ahead state of the turning wheels due to a cause attributable to the work of assembling the turning unit, the standard value can be adjusted through the standard value adjustment process. This standard value adjustment process is performed on the condition that the diagnostic state is present. A situation where the vehicle is in the diagnostic state is, for example, a situation where a user of the vehicle is not expected to get in the vehicle and perform driving etc. and corresponds to a situation where the vehicle is undergoing maintenance work. A situation where the vehicle is undergoing maintenance work is a situation where no inconvenience is caused to the user of the vehicle even when feedback control on the control angle is affected by adjustment of the standard value. Thus, when, in the straight-ahead state of the turning wheels, the control angle deviates from the value showing the straight-ahead state, this deviation of the control angle can be reduced without causing inconvenience to the user of the vehicle. Therefore, a decrease in the effect of performing feedback control on the control angle can be effectively mitigated.

In the above steering control device, the standard value adjustment process may include a process of adjusting the standard value so as to reflect an offset value that is obtained based on the control angle in the straight-ahead state.

According to this configuration, the offset value can be obtained by simply creating the straight-ahead state of the turning wheels. This is effective for simplifying the standard value adjustment process.

In the above steering control device, the standard value adjustment process may include a process of setting an upper limit for an absolute value of the offset value.

According to this configuration, occurrence of a situation where the absolute value of the offset value becomes large and consequently a turnable range of the turning wheels differs greatly between left and right can be reduced. Therefore, the standard value can be adjusted without causing discomfort to the user of the vehicle during driving.

In the above steering control device, the control unit may be configured to execute the standard value adjustment process during travel of the vehicle on the condition that the diagnostic state is present. The standard value adjustment process may include a process of obtaining, as the offset value, a value resulting from accumulating a unit amount that is a small value compared with a value by which the control angle in the straight-ahead state deviates from the value showing the straight-ahead state.

According to this configuration, for example, the standard value can be adjusted during travel while a maintenance worker makes the vehicle travel. In this case, since the vehicle can be actually made to travel, deviation of the control angle in the straight-ahead state of the turning wheels from the value showing the straight-ahead state can be accurately reflected in adjustment of the standard value. Further, since a value resulting from accumulating the unit amount can be obtained as the offset value, adjustment of the standard value can be performed stepwise. This is effective for ensuring safety of the maintenance worker in the case of adjusting the standard value while the vehicle is traveling.

In the above steering control device, the control unit may be configured to execute the standard value adjustment process while the vehicle is stationary on the condition that the diagnostic state is present. The standard value adjustment process may include a process of obtaining the control angle in the straight-ahead state as the offset value.

According to this configuration, for example, a maintenance worker can adjust the standard value while the vehicle is stationary. In this case, since the vehicle is stationary, adjustment of the standard value can be performed without taking into account the feedback control on the control angle being affected by adjustment of the standard value. This is effective for ensuring safety of the maintenance worker and realizing high-efficiency work in adjusting the standard value.

A second aspect of the present disclosure is a standard value adjustment method. The standard value adjustment method adjusts a standard value that is information stored in a control unit belonging to a steering control device that controls, as a target, a steering device including a turning unit that operates to turn a turning wheel of a vehicle. The standard value is a value associated with a mechanical state of the turning unit showing a straight-ahead state that is a turning state of the turning wheel when the vehicle moves straight ahead. The standard value adjustment method includes a diagnostic state setting step and a standard value adjustment step. In the diagnostic state setting step, the standard value is used when the control unit calculates, as an absolute angle relative to the standard value, a control angle that is angle information showing an actual turning state of the turning wheel; the control angle is used as a control amount when the control unit performs feedback control in controlling operation of the turning unit so as to turn the turning wheel to a target turning state; and a diagnostic state for diagnosing an abnormal state of the vehicle is set through operation of a diagnostic tool that is connected to the vehicle from outside. In the standard value adjustment step, the standard value stored in the control unit is adjusted on the condition that the diagnostic state is set. The standard value adjustment step includes a step of, when, in the straight-ahead state, the control angle deviates from a value showing the straight-ahead state, adjusting the standard value through operation of the diagnostic tool such that the deviation of the control angle from the value showing the straight-ahead state decreases.

According to this method, for example, when the standard value deviates from the value associated with the mechanical state of the turning unit showing the straight-ahead state of the turning wheels due to a cause attributable to the work of assembling the turning unit, the standard value can be adjusted through the standard value adjustment process. This standard value adjustment process is performed on the condition that the diagnostic state is present. A situation where the vehicle is in the diagnostic state is, for example, a situation where a user of the vehicle is not expected to get in the vehicle and perform driving etc. and corresponds to a situation where the vehicle is undergoing maintenance work. A situation where the vehicle is undergoing maintenance work is a situation where no inconvenience is caused to the user of the vehicle even when feedback control on the control angle is affected by adjustment of the standard value. Thus, when, in the straight-ahead state of the turning wheels, the control angle deviates from the value showing the straight-ahead state, this deviation of the control angle can be reduced without causing inconvenience to the user of the vehicle. Therefore, a decrease in the effect of performing feedback control on the control angle can be effectively mitigated.

According to the present disclosure, a decrease in the effect of performing feedback control on the control angle can be effectively mitigated.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Figure 1:
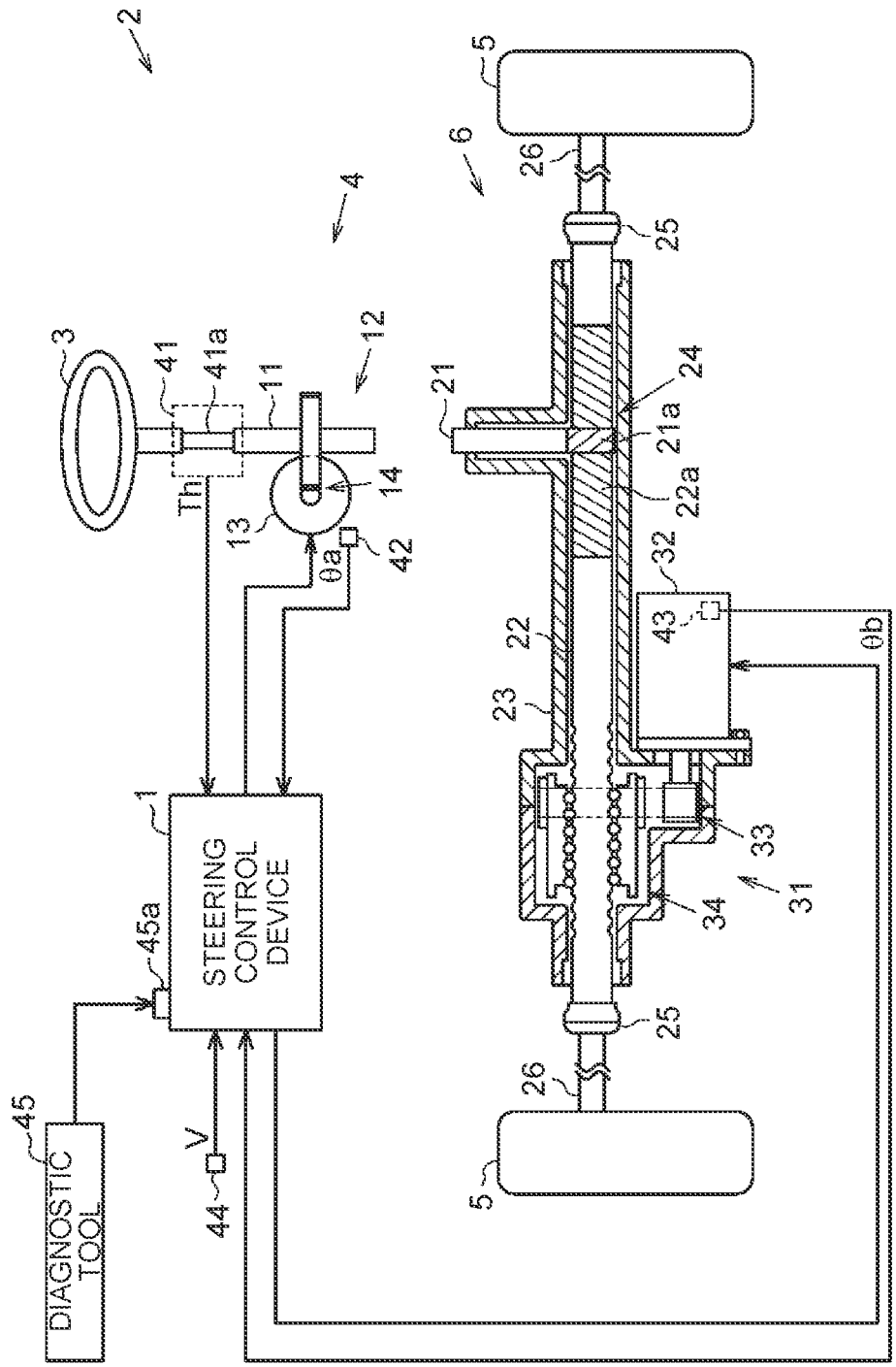
FIG. 1 is a diagram showing a schematic configuration of a steer-by-wire steering device.

A steering control device 1 according to a first embodiment will be described below. As shown in FIG. 1, the steering control device 1 controls a steering device 2 as a target. The steering device 2 is configured as a steer-by-wire vehicle steering device. The steering device 2 includes a steering unit 4 and a turning unit 6. The steering unit 4 is steered by a driver through a steering wheel 3 of the vehicle. The turning unit 6 turns left and right turning wheels 5 of the vehicle according to steering input into the steering unit 4 by the driver. The steering device 2 of this embodiment has a structure in which a power transmission path between the steering unit 4 and the turning unit 6 is always mechanically cut off. Thus, this steering device 2 has a structure in which a power transmission path between a steering-side actuator 12, to be described later, and a turning-side actuator 31, to be described later, is always mechanically cut off.

The steering unit 4 includes a steering shaft 11 and the steering-side actuator 12. The steering shaft 11 is coupled to the steering wheel 3. The steering-side actuator 12 has a steering-side motor 13 that is a drive source and a steering-side speed reduction mechanism 14. The steering-side motor 13 is a reaction force motor that applies a steering reaction force, which is a force resisting steering, to the steering wheel 3 through the steering shaft 11. The steering-side motor 13 is coupled to the steering shaft 11 through the steering-side speed reduction mechanism 14 that is formed by, for example, a worm-and-wheel. As the steering-side motor 13 of the embodiment, for example, a three-phase brushless motor is adopted.

The turning unit 6 includes a pinion shaft 21, a rack shaft 22 as a turning shaft, and a rack housing 23. The pinion shaft 21 and the rack shaft 22 are coupled together at a predetermined intersection angle. Pinion teeth 21a formed on the pinion shaft 21 and rack teeth 22a formed on the rack shaft 22 are meshed together to constitute a rack-and-pinion mechanism 24. Thus, the pinion shaft 21 corresponds to a rotating shaft of which a rotation angle can be converted into a turning angle $\theta i$ that is a turning position of the turning wheels 5. The rack housing 23 houses the rack-and-pinion mechanism 24. One end of the pinion shaft 21 on the opposite side from the side coupled to the rack shaft 22 protrudes from the rack housing 23. Both ends of the rack shaft 22 protrude from both ends of the rack housing 23 in an axial direction. Tie rods 26 are coupled to respective ends of the rack shaft 22 through rack ends 25 that are formed by ball joints. Leading ends of the tie rods 26 are coupled to knuckles (not shown) with which the left and right turning wheels 5 are respectively combined.

The turning unit 6 includes the turning-side actuator 31. The turning-side actuator 31 includes a turning-side motor 32 that is a drive source, a transmission mechanism 33, and a conversion mechanism 34. The turning-side motor 32 applies a turning force for turning the turning wheels 5 to the rack shaft 22 through the transmission mechanism 33 and the conversion mechanism 34. The turning-side motor 32 transmits rotation to the conversion mechanism 34 through the transmission mechanism 33 that is formed by, for example, a belt transmission mechanism. The transmission mechanism 33 converts rotation of the turning-side motor 32 into reciprocating motion of the rack shaft 22 through the conversion mechanism 34 that is formed by, for example, a ball screw mechanism. As the turning-side motor 32 of the embodiment, for example, a three-phase brushless motor is adopted.

In the steering device 2 thus configured, the turning angle $\theta i$ of the turning wheels 5 is changed as a motor torque is applied as a turning force from the turning-side actuator 31 to the rack shaft 22 according to steering operation by the driver. In this case, a steering reaction force resisting steering by the driver is applied from the steering-side actuator 12 to the steering wheel 3. Thus, in the steering device 2, a steering torque Th required to steer the steering wheel 3 is changed by the steering reaction force that is a motor torque applied from the steering-side actuator 12.

The reason why the pinion shaft 21 is provided is to support the rack shaft 22 inside the rack housing 23 along with the pinion shaft 21. That is, by a support mechanism (not shown) provided in the steering device 2, the rack shaft 22 is supported so as to be movable along an axial direction thereof as well as is pressed toward the pinion shaft 21. Thus, the rack shaft 22 is supported inside the rack housing 23. However, another support mechanism that supports the rack shaft 22 in the rack housing 23 without using the pinion shaft 21 may be provided.

Electrical Configuration of Steering Device 2

As shown in FIG. 1, the steering-side motor 13 and the turning-side motor 32 are connected to the steering control device 1. The steering control device 1 controls the operation of the steering-side motor 13 and the turning-side motor 32.

Detection results of various sensors are input into the steering control device 1. The various sensors are connected to the steering control device 1. The various sensors include, for example, a torque sensor 41, a steering-side rotation angle sensor 42, a turning-side rotation angle sensor 43, and a vehicle speed sensor 44.

The torque sensor 41 detects the steering torque Th that is a value showing a torque applied to the steering shaft 11 by steering operation performed by the driver. The steering-side rotation angle sensor 42 detects a rotation angle $\theta a$ that is an angle of a rotating shaft of the steering-side motor 13 within a range of 360 degrees. The turning-side rotation angle sensor 43 detects a rotation angle $\theta b$ that is an angle of a rotating shaft of the turning-side motor 32 within a range of 360 degrees. The vehicle speed sensor 44 detects a vehicle speed V that is a travel speed of the vehicle.

Specifically, the torque sensor 41 is provided at a part of the steering shaft 11, on the side of the steering wheel 3 relative to the steering-side speed reduction mechanism 14. The torque sensor 41 detects the steering torque Th based on twisting of a torsion bar 41a that is provided at an intermediate part of the steering shaft 11. The steering torque Th is detected, for example, as a positive value when the vehicle is steered rightward and as a negative value when the vehicle is steered leftward.

The steering-side rotation angle sensor 42 is provided in the steering-side motor 13. The rotation angle $\theta a$ of the steering-side motor 13 is used to calculate a steering angle $\theta h$. The steering-side motor 13 and the steering shaft 11 operate in conjunction with each other through the steering-side speed reduction mechanism 14. Thus, there is a correlation between the rotation angle $\theta a$ of the steering-side motor 13 and the rotation angle of the steering shaft 11 and therefore the steering angle $\theta h$ that is a rotation angle showing a rotation position of the steering wheel 3. Accordingly, the steering angle $\theta h$ can be obtained based on the rotation angle $\theta a$ of the steering-side motor 13. The rotation angle $\theta a$ is detected, for example, as a positive value when the vehicle is steered rightward and as a negative value when the vehicle is steered leftward.

The turning-side rotation angle sensor 43 is provided in the turning-side motor 32. The rotation angle $\theta b$ of the turning-side motor 32 is used to calculate a pinion angle $\theta p$. The turning-side motor 32 and the pinion shaft 21 operate in conjunction with each other though the transmission mechanism 33, the conversion mechanism 34, and the rack-and-pinion mechanism 24. Thus, there is a correlation between the rotation angle $\theta b$ of the turning-side motor 32 and the pinion angle $\theta p$ that is a rotation angle of the pinion shaft 21. Accordingly, the pinion angle $\theta p$ can be obtained based on the rotation angle $\theta b$ of the turning-side motor 32. The pinion shaft 21 is meshed with the rack shaft 22. Therefore, there is also a correlation between the pinion angle $\theta p$ and an amount of movement of the rack shaft 22. Thus, the pinion angle $\theta p$ is angle information showing a turning state of the turning wheels 5 and is a value reflecting the turning angle $\theta i$ that is a turning position of the turning wheels 5. The rotation angle $\theta b$ is detected, for example, as a positive value when the vehicle is steered rightward and as a negative value when the vehicle is steered leftward.

A diagnostic tool 45 can be connected to the steering control device 1. The diagnostic tool 45 is, for example, used at a maintenance factory in which vehicles are maintained, such as a dealer. The diagnostic tool 45 is connected to the vehicle from outside. The steering control device 1 of the embodiment has a connector 45a. The diagnostic tool 45 is connected to the vehicle from outside through the connector 45a of the steering control device 1. The connector 45a may belong to a control device that is installed in the vehicle separately from the steering control device 1, or may be installed in the vehicle as a dedicated connector. The diagnostic tool 45 is a tool for diagnosing an abnormal state of the vehicle.

In a state of being connected to the steering control device 1, the diagnostic tool 45 orders the vehicle, i.e., the steering control device 1, to set a factory mode that is a diagnostic state through operation of a maintenance worker. A situation where the factory mode is set is a situation where a user of the vehicle is not expected to get in the vehicle and perform driving etc., and is a situation where the vehicle is undergoing maintenance work. While the factory mode is set, a worker can check a result of diagnosing an abnormal state of the vehicle, i.e., the steering control device 1 using the diagnostic tool 45. Then, the worker can take measures according to the result of diagnosis through operation of the diagnostic tool 45.

Functions of Steering Control Device 1

The steering control device 1 includes a central processing unit (CPU) and a memory (neither of which is shown). The steering control device 1 executes various processes as the CPU executes programs stored in the memory on a predetermined calculation cycle. The CPU and the memory constitute a microcomputer that is a processing circuit. The memory includes a computer-readable medium, such as a random-access memory (RAM) or a read-only memory (ROM). However, it is one example that various processes are realized by software. The processing circuit belonging to the steering control device 1 may be configured to realize at least some of the processes by a hardware circuit, such as a logic circuit.

Figure 2:
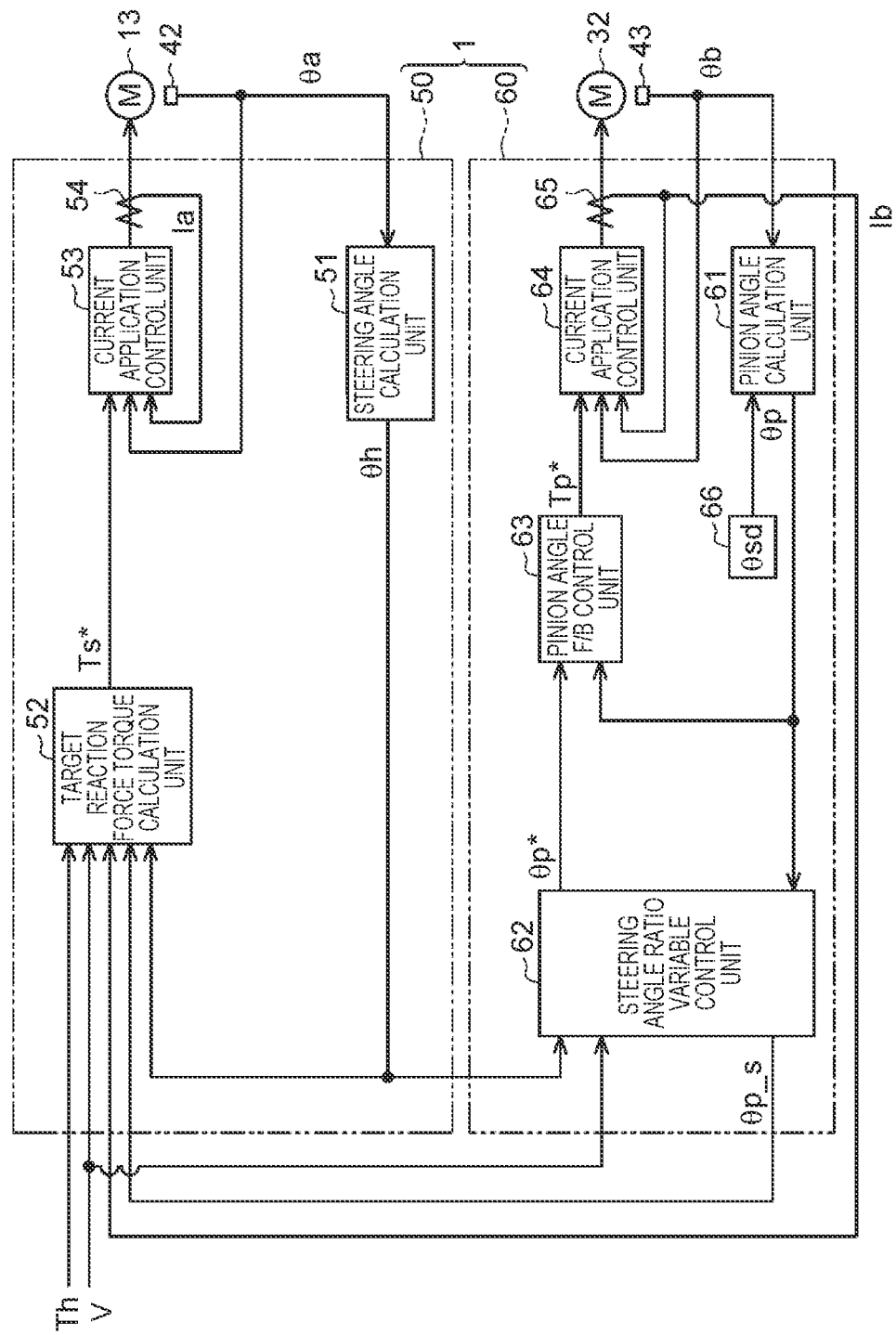
FIG. 2 is a block diagram showing functions of a steering control device.

FIG. 2 shows some of the processes executed by the steering control device 1. The processes shown in FIG. 2 are some of the processes that are realized as the CPU executes programs stored in the memory, depicted by the type of process to be realized.

The steering control device 1 has a steering-side control unit 50 and a turning-side control unit 60. The steering-side control unit 50 controls power supply to the steering-side motor 13. The steering-side control unit 50 has a steering-side current sensor 54. The steering-side current sensor 54 detects a steering-side actual current value Ia that is obtained from current values of the respective phases of the steering-side motor 13 flowing through connection lines between the steering-side control unit 50 and motor coils of the respective phases of the steering-side motor 13. The steering-side current sensor 54 acquires, as a current, a voltage drop of a shunt resistor connected to a source side of each switching element in an inverter (not shown) that is provided so as to correspond to the steering-side motor 13. In FIG. 2, for the convenience of description, the connection lines of the respective phases and the current sensors of the respective sensors are collectively shown as one connection line and one current sensor.

The turning-side control unit 60 controls power supply to the turning-side motor 32. The turning-side control unit 60 has a turning-side current sensor 65. The turning-side current sensor 65 detects a turning-side actual current value Ib that is obtained from current values of the respective phases of the turning-side motor 32 flowing through connection lines between the turning-side control unit 60 and motor coils of the respective phases of the turning-side motor 32. The turning-side current sensor 65 acquires, as a current, a voltage drop of a shunt resistor connected to a source side of each switching element in an inverter (not shown) that is provided so as to correspond to the turning-side motor 32. In FIG. 2, for the convenience of description, the connection lines of the respective phases and the current sensors of the respective phases are collectively shown as one connection line and one current sensor. In this embodiment, the turning-side control unit 60 is one example of a control unit that controls the operation of the turning unit 6 of the steering device 2, i.e., the turning-side actuator 31.

Steering-Side Control Unit 50

As shown in FIG. 2, the steering torque Th, the vehicle speed V, the rotation angle $\theta a$, the turning-side actual current value Ib, and a turning-converted angle $\theta p\_s$, to be described later, are input into the steering-side control unit 50. The steering-side control unit 50 controls power supply to the steering-side motor 13 based on the steering torque Th, the vehicle speed V, the rotation angle $\theta a$, the turning-side actual current value Ib, and the turning-converted angle $\theta p\_s$. The turning-converted angle $\theta p\_s$ is calculated based on the pinion angle $\theta p$.

The steering-side control unit 50 has a steering angle calculation unit 51, a target reaction force torque calculation unit 52, and a current application control unit 53. The rotation angle $\theta a$ is input into the steering angle calculation unit 51. The steering angle calculation unit 51 converts the rotation angle $\theta a$ into an integrated angle including a range exceeding 360° by, for example, counting the number of rotations of the steering-side motor 13 from a steering neutral position that is the position of the steering wheel 3 when the vehicle is moving straight ahead. The steering angle calculation unit 51 calculates the steering angle $\theta h$ by multiplying the integrated angle obtained by conversion by a conversion factor that is based on a rotation speed ratio of the steering-side speed reduction mechanism 14. That is, the steering angle calculation unit 51 calculates the steering angle $\theta h$ as an absolute angle relative to the steering neutral position. The steering angle $\theta h$ thus obtained is output to the target reaction force torque calculation unit 52 and the turning-side control unit 60.

The steering torque Th, the vehicle sped V, the turning-side actual current value Ib, the turning-converted angle $\theta p\_s$, to be described later, and the steering angle $\theta h$ are input into the target reaction force torque calculation unit 52. The target reaction force torque calculation unit 52 calculates a target reaction force torque command value Ts* based on the steering torque Th, the vehicle sped V, the turning-side actual current value Ib, the turning-converted angle $\theta p\_s$, and the steering angle $\theta h$. The target reaction force torque command value Ts* is a target reaction force control amount for the steering reaction force of the steering wheel 3 to be generated through the steering-side motor 13. The target reaction force torque command value Ts* thus obtained is output to the current application control unit 53.

The target reaction force torque command value Ts*, the rotation angle $\theta a$, and the steering-side actual current value Ia are input into the current application control unit 53. The current application control unit 53 calculates a current command value Ia* for the steering-side motor 13 based on the target reaction force torque command value Ts*. Then, the current application control unit 53 obtains a deviation, from the current command value Ia*, of a current value on a dq-coordinate system obtained by converting the steering-side actual current value Ia, detected through the steering-side current sensor 54, based on the rotation angle θa, and controls power supply to the steering-side motor 13 so as to eliminate this deviation. As a result, the steering-side motor 13 generates a torque according to the target reaction force torque command value Ts*. Thus, the driver can feel an appropriate steering response according to a road reaction force.

Turning-Side Control Unit 60

As shown in FIG. 2, the vehicle speed V, the rotation angle θb, and the steering angle θh are input into the turning-side control unit 60. The turning-side control unit 60 controls power supply to the turning-side motor 32 based on the vehicle speed V, the rotation angle θb, and the steering angle θh.

The turning-side control unit 60 has a pinion angle calculation unit 61, a steering angle ratio variable control unit 62, an angle feedback control unit ("PINION ANGLE FB CONTROL UNIT" in FIG. 2) 63, and a current application control unit 64.

The rotation angle θb is input into the pinion angle calculation unit 61. The pinion angle calculation unit 61 converts the rotation angle θb into an integrated angle including a range exceeding 360° by, for example, counting the number of rotations of the turning-side motor 32 from a rack neutral position that is the position of the rack shaft 22 when the vehicle is moving straight ahead. The pinion angle calculation unit 61 calculates the pinion angle θp that is an actual rotation angle of the pinion shaft 21 by multiplying the integrated angle obtained by conversion by a conversion factor that is based on a rotation speed ratio of the transmission mechanism 33, a lead of the conversion mechanism 34, and a rotation speed ratio of the rack-and-pinion mechanism 24. Thus, the pinion angle calculation unit 61 calculates the pinion angle θp as an absolute angle relative to the rack neutral position. The pinion angle θp thus obtained is output to the steering angle ratio variable control unit 62 and the angle feedback control unit 63.

The vehicle speed V, the steering angle θh, and the pinion angle θp are input into the steering angle ratio variable control unit 62. The steering angle ratio variable control unit 62 calculates a target pinion angle θp* based on the steering angle θh. The target pinion angle θp* is a target control amount for the pinion angle θp obtained as a result of turning the turning wheels 5, i.e., for the turning state of the turning wheels 5. The target pinion angle θp* is calculated, relative to the steering angle θh, as an angle converted into a scale of the pinion angle θp taking into account a steering angle ratio that is the ratio between the steering angle θh and the pinion angle θp. The steering angle ratio variable control unit 62 calculates the turning-converted angle θp_s based on the pinion angle θp. The turning-converted angle θp_s is calculated, relative to the pinion angle θp, as an angle converted into a scale of the steering angle θh taking the steering angle ratio into account.

The steering angle ratio variable control unit 62 changes the steering angle ratio according to the vehicle speed V. For example, the steering angle ratio variable control unit 62 changes the steering angle ratio so as to change the pinion angle θp more greatly relative to a change in the steering angle θh when the vehicle speed V is low than when the vehicle speed V is high. That is, in the calculation of the target pinion angle θp*, a conversion calculation is performed such that a positional relationship between the target pinion angle θp* and the steering angle θh meets a predetermined correspondence relationship. In the calculation of the turning-converted angle θp_s, for example, a reverse conversion calculation using a reciprocal of a value used in the aforementioned conversion calculation is performed such that a positional relationship between the turning-converted angle θp_s and the pinion angle θp meets a predetermined correspondence relationship. The target pinion angle θp* thus obtained is output to the angle feedback control unit 63. The turning-converted angle θp_s is output to the steering-side control unit 50, i.e., the target reaction force torque calculation unit 52.

The target pinion angle θp* and the pinion angle θp are input into the angle feedback control unit 63. The angle feedback control unit 63 calculates a turning force command value Tp* as a target control amount for a turning force through an angle feedback process of performing feedback control on the pinion angle θp so as to adapt the pinion angle θp to the target pinion angle θp*. The turning force command value Tp* thus obtained is output to the current application control unit 64. In this embodiment, the pinion angle θp is one example of the control angle.

The turning force command value Tp*, the rotation angle θb, and the turning-side actual current value Ib are input into the current application control unit 64. The current application control unit 64 calculates a current command value Ib* for the turning-side motor 32 based on the turning force command value Tp*. Then, the current application control unit 64 obtains a deviation, from the current command value Ib*, of a current value on a dq-coordinate system that is obtained by converting the turning-side actual current value Ib, detected through the turning-side current sensor 65, based on the rotation angle θb, and controls power supply to the turning-side motor 32 so as to eliminate this deviation. As a result, the turning-side motor 32 rotates by an angle according to the turning force command value Tp*. Thus, the turning-side control unit 60 controls the operation of the steering device 2, i.e., the turning unit 6 such that the positional relationship between the steering angle θh and the pinion angle θp, i.e., the steering angle θh and the turning angle θi meets a predetermined correspondence relationship defined according to the steering angle ratio.

About Standard Value θsd

As shown in FIG. 2, the turning-side control unit 60 has a storage unit 66. The storage unit 66 is a predetermined storage area in the memory of the steering control device 1. The storage unit 66 stores a standard value θsd that is a value associated with a mechanical state of the turning unit 6 showing a straight-ahead state that is a turning state of the turning wheels 5 when the vehicle moves straight ahead. That is, the standard value θsd is a value showing the rack neutral position. Thus, the pinion angle calculation unit 61 executes a control angle calculation process of calculating the pinion angle θp as an absolute angle relative to the standard value θsd.

The standard value θsd is set, for example, during the work of assembling the turning unit 6 at a factory etc. During the work of assembling the turning unit 6, the standard value θsd is set as a value at which the pinion angle θp shows a zero value when the turning wheels 5 are in the straight-ahead state and the rack shaft 22 is at the rack neutral position. The zero value of the pinion angle θp is a value corresponding to a zero value at which the steering angle θh showing the position of the steering wheel 3 corresponds to the steering neutral position. In some cases, the standard value θsd is set as a value that deviates from the rack neutral position due to a cause attributable to the work of assembling the turning unit 6. In this case, the zero value of the pinion angle θp is not a value corresponding to the zero value at which the steering angle θh showing the position of the steering wheel 3 corresponds to the steering neutral position. This leads to a situation where, when the turning-side control unit 60 performs feedback control on the pinion angle θp so as to meet an angle corresponding to the steering angle θh, deviation occurs in the relationship between the position of the steering wheel 3 and the turning state of the turning wheels 5. To cope with such a situation, the turning-side control unit 60 functions to adjust the standard value θsd stored in the storage unit 66. In the following, a standard value adjustment process for adjusting the standard value θsd will be described in detail.

Standard Value Adjustment Process

Figure 3:
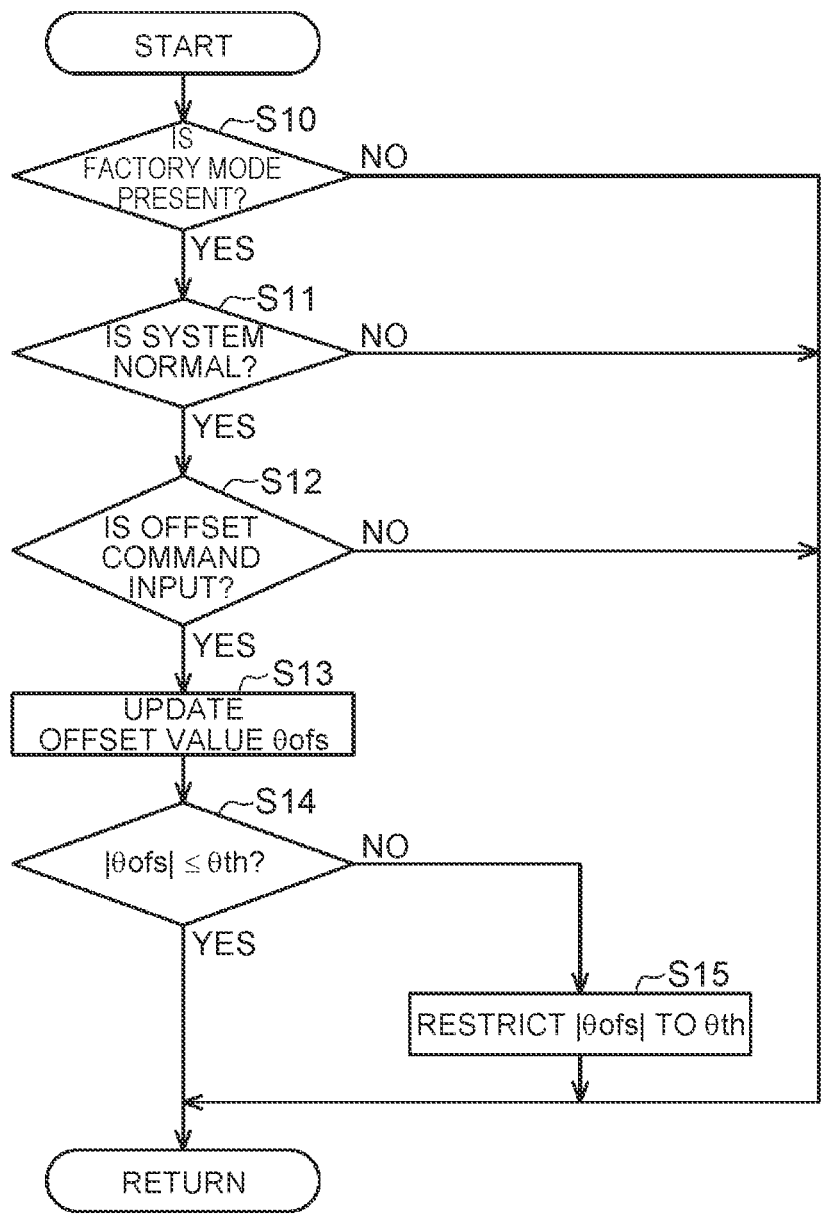
FIG. 3 is a flowchart illustrating a standard value adjustment process in a first embodiment.

As shown in FIG. 3, the turning-side control unit 60 executes the standard value adjustment process on a predetermined control cycle. In the standard value adjustment process, the turning-side control unit 60 determines whether the factory mode is present (step S10). In step S10, the turning-side control unit 60 determines whether a mode setting command that orders the factory mode to be set is input through the diagnostic tool 45. When the turning-side control unit 60 determines that the mode setting command is not input and that therefore the factory mode is not present (step S10: NO), the turning-side control unit 60 ends the standard value adjustment process and moves to another process.

On the other hand, when the turning-side control unit 60 determines in step S10 that the mode setting command is input and that therefore the factory mode is present (step S10: YES), the turning-side control unit 60 determines whether the system of the steering device 2 including the steering control device 1 is normal (step S11). In step S11, the turning-side control unit 60 determines whether normal turning-side control can be properly executed for the steer-by-wire steering device 2. The normal turning-side control refers to reflecting the state of the steering unit 4 in the state of the turning unit 6 and thereby controlling the turning wheels 5 so as to turn to an angle according to steering operation performed by the driver. When the turning-side control unit 60 determines that the normal turning-side control cannot be properly executed (step S11: NO), the turning-side control unit 60 ends the standard value adjustment process and moves to another process. When the turning-side control unit 60 determines that the normal turning-side control cannot be properly executed, the turning-side control unit 60 outputs information to that effect to the diagnostic tool 45.

On the other hand, when the turning-side control unit 60 determines in step S11 that the normal turning-side control can be properly executed (step S11: YES), the turning-side control unit 60 determines whether an offset command is input through the diagnostic tool 45 (step S12). When the offset command is not input (step S12: NO), the turning-side control unit 60 ends the standard value adjustment process and moves to another process.

On the other hand, when the offset command is input in step S12 (step S12: YES), the turning-side control unit 60 updates the offset value θofs (step S13). In step S13, the turning-side control unit 60 updates the offset value θofs so as to reflect a leftward adjustment amount θl or a rightward adjustment amount θr ordered by the offset command. The offset value θofs is a value for adjusting the standard value θsd. The turning-side control unit 60 uses a value obtained by adding or subtracting the offset value θofs to or from the standard value θsd stored in the storage unit 66 as the adjusted standard value θsd for calculating the pinion angle θp. For the offset value θofs, a zero value is set as an initial value. Thus, when the offset value θofs is a zero value, the adjusted standard value θsd is the same value as the standard value θsd stored in the storage unit 66 that has been set during the work of assembling the turning unit 6 at a factory etc.

In step S13, the turning-side control unit 60 increases or decreases the offset value θofs by a predetermined unit amount according to the content ordered by the offset command determined in step S12. For example, when the content ordered by the offset command is the leftward adjustment amount θl, the turning-side control unit 60 increases the offset value θofs by the unit amount. This means adjusting the standard value θsd so as to shift toward the rightward steering side that is the positive direction of the rotation angle θb. On the other hand, when the content ordered by the offset command is the rightward adjustment amount θr, the turning-side control unit 60 decreases the offset value θofs by the unit amount. This means adjusting the standard value θsd so as to shift toward the leftward steering side that is the negative direction of the rotation angle θb. As the unit amount, for example, a value within an experimentally obtained range is set that is a small value compared with an imaginable magnitude of deviation of the standard value θsd.

Then, the turning-side control unit 60 determines whether the absolute value of the offset value θofs having been updated in step S13 is equal to or smaller than a threshold value θth (step S14). In step S14, the turning-side control unit 60 restricts the upper limit of the absolute value of the offset value θofs such that the absolute value does not become too large. As the threshold value θth, for example, a value within an experimentally obtained range is set such that a difference in the turnable range of the turning wheels 5, or the range of steering between left and right does not cause discomfort to the driver.

In step S14, when the absolute value of the offset value θofs having been updated in step S13 is equal to or smaller than the threshold value θth (step S14: YES), the turning-side control unit 60 ends the standard value adjustment process and moves to another process. In this case, the turning-side control unit 60 uses the offset value θofs having been updated in step S13 for the subsequent adjustment of the standard value θsd.

On the other hand, when the absolute value of the offset value θofs having been updated in step S13 is larger than the threshold value θth (step S14: NO), the turning-side control unit 60 restricts the absolute value of the offset value θofs to the threshold value θth (step S15). When going through step S15, the turning-side control unit 60 uses, for the subsequent adjustment of the standard value θsd, the offset value θofs that is obtained by restricting the absolute value of the value having been updated in step S13 to the threshold value θth. Thereafter, the turning-side control unit 60 ends the standard value adjustment process and moves to another process.

As a result of executing the process of steps S10 to S15 repeatedly on a predetermined control cycle as the standard value adjustment process, the turning-side control unit 60 cumulatively reflects the leftward adjustment amount θl or the rightward adjustment amount θr each time it is determined that the offset command is input in step S12. Thus, the turning-side control unit 60 is configured to obtain, as the offset value θofs, a value resulting from accumulating the unit amount according to the leftward adjustment amount θl or the rightward adjustment amount θr. Further, the turning-side control unit 60 is configured to restrict the offset value θofs within such a range that no discomfort is caused to the driver, rather than unlimitedly accumulating the offset value θofs.

Standard Value Adjustment Method

Figure 4:
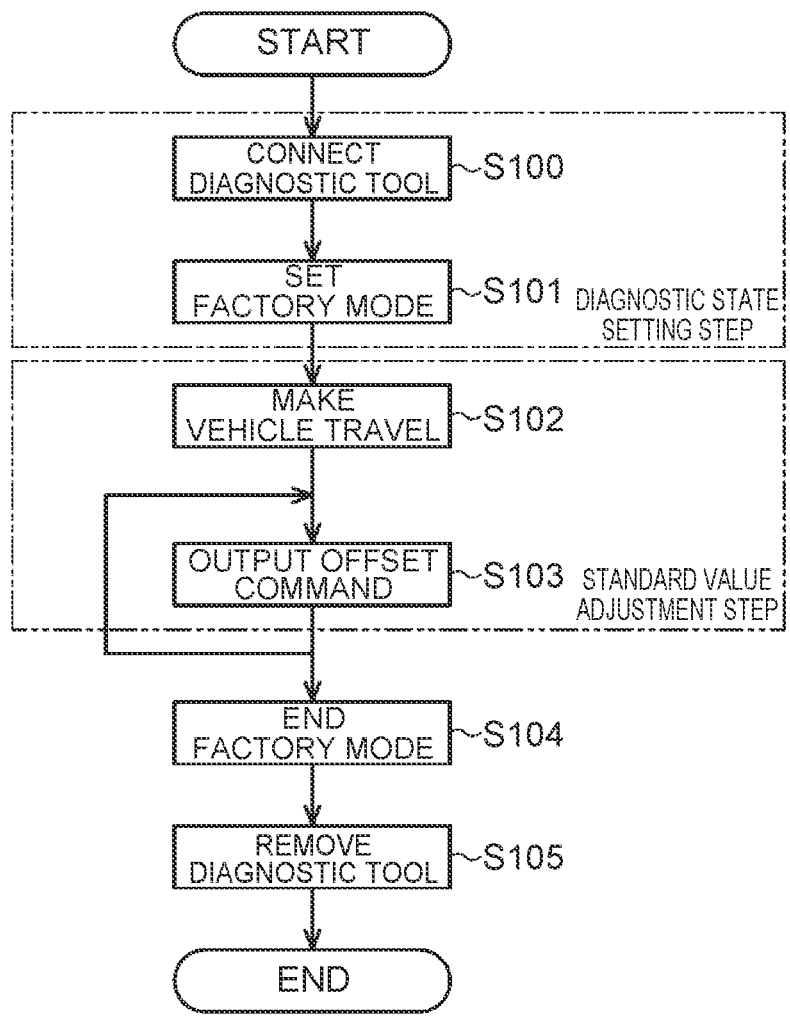
FIG. 4 is a flowchart illustrating a standard value adjustment method in the first embodiment.

As shown in FIG. 4, a worker at a maintenance factory where vehicles are maintained, such as a dealer, adjusts the standard value θsd in accordance with the following standard value adjustment method. In this standard value adjustment method, the worker connects the diagnostic tool 45 to the vehicle, i.e., the steering control device 1 (step S100). Then, the worker sets the factory mode through operation of the diagnostic tool 45 (step S101). In this case, the diagnostic tool 45 outputs a mode setting command for ordering the steering control device 1 to set the factory mode. In this embodiment, the steps of steps S100, S101 correspond to a diagnostic state setting step.

Then, the worker makes the vehicle travel with the factory mode set (step S102). In step S102, the worker makes the vehicle travel such that the turning wheels 5 assume the straight-ahead state. For example, when the standard value θsd is a value deviating from the rack neutral position, positioning the steering wheel 3 so as to make the vehicle travel straight ahead causes the position of the steering wheel 3 to shift from the steering wheel neutral position toward one of the leftward and rightward steering sides. The amount of shift when the position shifts toward one steering side corresponds to the magnitude of a value by which the standard value θsd deviates from the rack neutral position.

Then, the worker outputs the offset command through operation of the diagnostic tool 45 (step S103). In step S103, the worker operates the diagnostic tool 45 so as to output the offset command that orders the leftward adjustment amount θl or the rightward adjustment amount θr according to the position of the steering wheel 3. For example, when the position of the steering wheel 3 has shifted from the steering wheel neutral position toward the rightward steering side, the worker performs operation of outputting the offset command that orders the leftward adjustment amount θl. This means adjusting the standard value θsd so as to shift toward the rightward steering side that is the positive direction of the rotation angle θb. On the other hand, when the position of the steering wheel 3 has shifted from the steering wheel neutral position toward the leftward steering side, the worker performs operation of outputting the offset command that orders the rightward adjustment amount θr. This means adjusting the standard value θsd so as to shift toward the leftward steering side that is the negative direction of the rotation angle θb.

When the offset command is input, the turning-side control unit 60 adjusts the standard value θsd by updating the offset value θofs. The turning-side control unit 60 performs feedback control on the pinion angle θp, obtained by using the adjusted standard value θsd, so as to meet an angle corresponding to the steering angle θh. The turning-side control unit 60 controls the steering device 2 such that the positional relationship between the steering angle θh and the pinion angle θp, i.e., between the steering angle θh and the turning angle θi approaches a predetermined correspondence relationship defined according to the steering angle ratio. As a result, the worker notices that, when making the vehicle travel such that the turning wheels 5 assume the straight-ahead state, the amount of shift of the position of the steering wheel 3 shifting from the steering wheel neutral position toward the rightward steering side decreases.

While checking the position of the steering wheel 3, the worker repeats the operation of outputting the offset command such that this position approaches the steering wheel neutral position (step S103). When repeating the operation of outputting the offset command results in the turning-side control unit 60 determining that the absolute value of the offset value θofs is larger than the threshold value θth (step S14: NO), the position of the steering wheel 3 stops changing. The steps of steps S102, S103 in this embodiment correspond to a standard value adjustment step.

Then, when the worker, while checking the position of the steering wheel 3, determines that adjustment of the standard value θsd has been completed, the worker ends the factory mode through operation of the diagnostic tool 45 (step S104). Then, the worker removes the diagnostic tool 45 from the steering control device 1 (step S105), and ends the work of adjusting the standard value.

How Standard Value θSd is Adjusted

Figure 5:
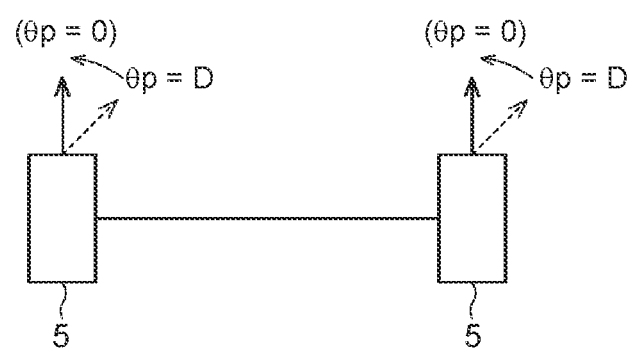
FIG. 5 is a view showing a state where a standard value deviates from a rack neutral position that shows a straight-ahead state of turning wheels.

As one example, a case will be described where, as shown in FIG. 5, the standard value θsd deviates from the rack neutral position toward the rightward steering side by a deviation amount D due to a cause attributable to the work of assembling the turning unit 6. In this one example, when making the vehicle travel such that the turning wheels 5 assume the straight-ahead state, the value of the pinion angle θp is calculated as the deviation amount D showing that the turning wheels 5 are oriented in the direction of the dashed arrows in FIG. 5. Thus, the position of the steering wheel 3 deviates from the steering wheel neutral position toward the rightward steering side by an amount corresponding to the deviation amount D. The standard value θsd can be adjusted by the standard value adjustment method shown in FIG. 4 performed by a worker as well as through the standard value adjustment process executed by the turning-side control unit 60 shown in FIG. 3. In this case, in the standard value adjustment method, the worker repeatedly outputs the offset command that orders the leftward adjustment amount θl through operation of the diagnostic tool 45.

Figure 6:
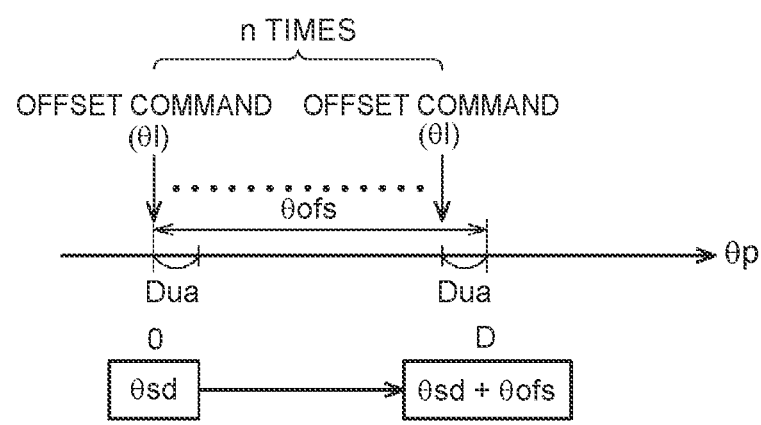
FIG. 6 is a view illustrating how the standard value is adjusted in the first embodiment.

As shown in FIG. 6, in the standard value adjustment process, the turning-side control unit 60 cumulatively increases the offset value θofs by a unit amount Dua each time the offset command ordering the leftward adjustment amount θl is input. For example, the offset value θofs matches the deviation amount D as the leftward adjustment amount θl is ordered n times. As the offset value θofs corresponding to the deviation amount D is added, the adjusted standard value θsd is adjusted so as to shift toward the rightward steering side by the deviation amount D. Thus, the adjusted standard value θsd matches the deviation amount D that is a value of the pinion angle θp when the vehicle is made to travel such that the turning wheels 5 assume the straight-ahead state, i.e., matches the rack neutral position.

In this way, when making the vehicle travel such that the turning wheels 5 assume the straight-ahead state, the value of the pinion angle θp is calculated, using the adjusted standard value θsd, as a zero value showing that the turning wheels 5 are oriented in the direction of the solid arrows in FIG. 5. Thus, the position of the steering wheel 3 matches the steering wheel neutral position.

Workings of Embodiment

According to this embodiment, when the standard value θsd deviates from the rack neutral position due to a cause attributable to the work of assembling the turning unit 6, the turning-side control unit 60 can adjust the standard value θsd through the standard value adjustment process. This standard value adjustment process is performed on the condition that the factory mode is present. A situation where the factory mode is set is a situation where a user of the vehicle is not expected to get in the vehicle and perform driving etc., and corresponds to a situation where the vehicle is undergoing maintenance work. A situation when the vehicle is undergoing maintenance work is a situation where no inconvenience is caused to the user of the vehicle even when feedback control on the pinion angle θp is affected by adjustment of the standard value θsd. Thus, when the pinion angle θp deviates from the zero value in the straight-ahead state of the turning wheels 5, this deviation of the pinion angle θp can be reduced without causing inconvenience to the user of the vehicle.

Advantages of Embodiment

In this embodiment, when the pinion angle θp deviates from the zero value in the straight-ahead state of the turning wheels 5, this deviation of the pinion angle θp can be reduced without causing inconvenience to the user of the vehicle. Therefore, a decrease in the effect of performing feedback control on the pinion angle θp can be effectively mitigated.

In this embodiment, the offset value θofs can be obtained by simply creating the straight-ahead state of the turning wheels 5. This is effective for simplifying the standard value adjustment process. In this embodiment, occurrence of a situation where the absolute value of the offset value θofs becomes large and consequently the turnable range of the turning wheels 5 differs greatly between left and right can be reduced. Therefore, the standard value θsd can be adjusted without causing discomfort to the user of the vehicle while driving.

In this embodiment, a worker can adjust the standard value θsd while making the vehicle travel. In this case, since the vehicle can be actually made to travel, deviation of the pinion angle θp from the zero value in the straight-ahead state of the turning wheels 5 can be accurately reflected in adjusting the standard value θsd. Further, since a value resulting from accumulating the unit amount can be obtained as the offset value θofs, adjustment of the standard value θsd can be performed stepwise. This is effective for ensuring safety of the maintenance worker in adjusting the standard value θsd while the vehicle is traveling.

Second Embodiment

Next, a steering control device 1 according to a second embodiment will be described. For the convenience of description, the same components as in the above-described first embodiment will be denoted by the same reference signs as in the first embodiment and description thereof will be omitted.

Standard Value Adjustment Process

Figure 7:
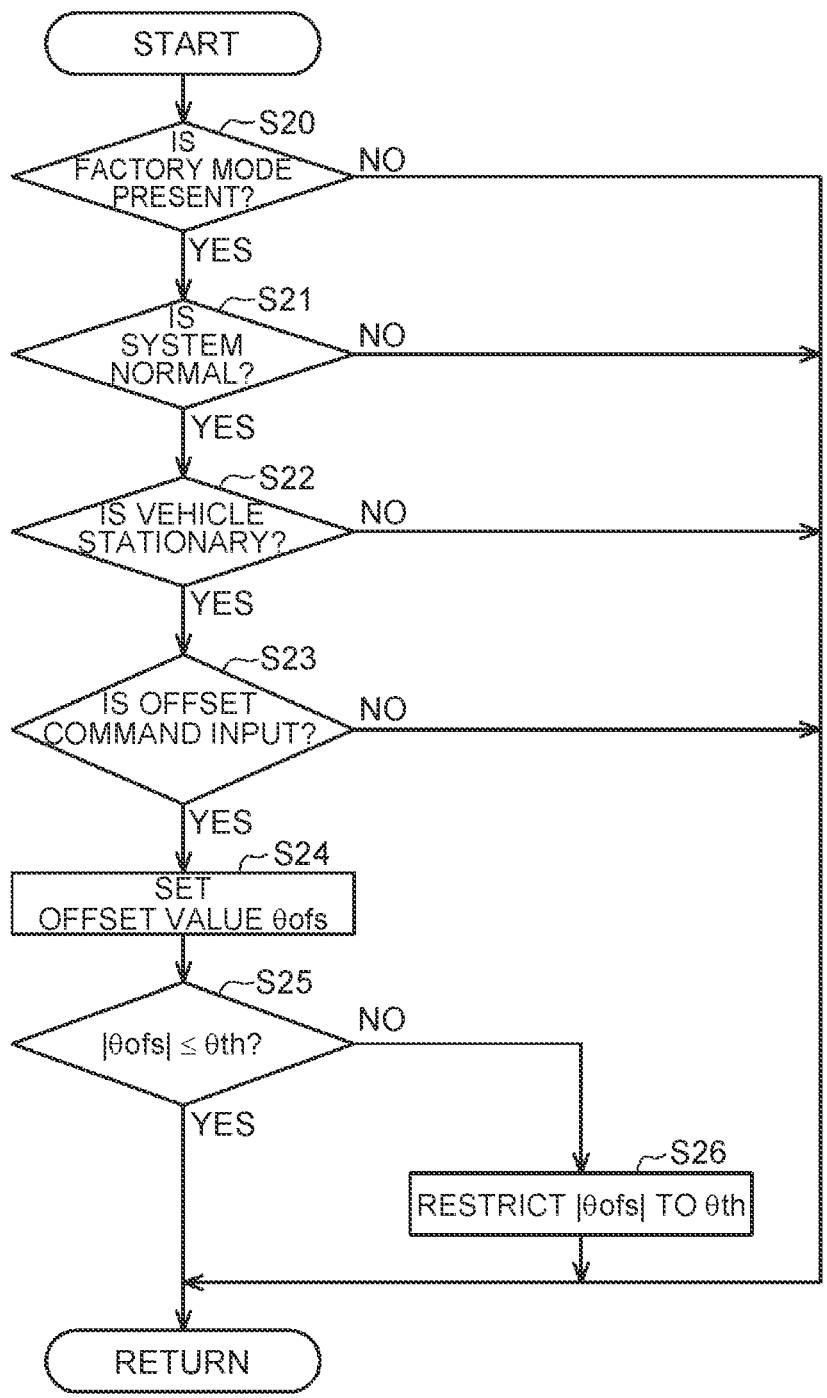
FIG. 7 is a flowchart illustrating a standard value adjustment process in a second embodiment.

As shown in FIG. 7, in the standard value adjustment process, the turning-side control unit 60 determines whether the factory mode is present (step S20). In step S20, the turning-side control unit 60 performs determination in the same manner as in step S10 of FIG. 3. When the turning-side control unit 60 determines that the mode setting command is not input and that therefore the factory mode is not present (step S20: NO), the turning-side control unit 60 ends the standard value adjustment process and moves to another process.

On the other hand, when the turning-side control unit 60 determines in step S20 that the mode setting command is input and that therefore the factory mode is present (step S20: YES), the turning-side control unit 60 determines whether the system of the steering device 2 including the steering control device 1 is normal (step S21). In step S21, the turning-side control unit 60 performs determination in the same manner as in step S11 of FIG. 3. When the turning-side control unit 60 determines that the normal turning-side control cannot be properly executed (step S21: NO), the turning-side control unit 60 ends the standard value adjustment process and moves to another process.

On the other hand, when the turning-side control unit 60 determines in step S21 that the normal turning-side control can be properly executed (step S21: YES), the turning-side control unit 60 determines whether the vehicle is stationary (step S22). In step S22, the turning-side control unit 60 determines whether the vehicle speed V is lower than a vehicle speed threshold value Vth. As the vehicle speed threshold value Vth, a value within an experimentally obtained range is set such that the vehicle speed V, when lower than the vehicle speed threshold value Vth, is an extremely low speed including a speed of a stationary vehicle. When the turning-side control unit 60 determines that the vehicle speed V is equal to or higher than the vehicle speed threshold value Vth and that therefore the vehicle is not stationary (step S22: NO), the turning-side control unit 60 ends the standard value adjustment process and moves to another process.

On the other hand, when the turning-side control unit 60 determines that the vehicle speed V is lower than the vehicle speed threshold value Vth and that therefore the vehicle is stationary (step S22: YES), the turning-side control unit 60 determines whether the offset command is input through the diagnostic tool 45 (step S23). When the offset command is not input (step S23: NO), the turning-side control unit 60 ends the standard value adjustment process and moves to another process.

On the other hand, when the offset command is input in step S23 (step S23: YES), the turning-side control unit 60 sets the offset value θofs (step S24). In step S24, triggered by input of the offset command, the turning-side control unit 60 sets the value of the pinion angle θp at that time as the offset value θofs. In this embodiment, the offset command is information for ordering the turning-side control unit 60 to adjust the standard value θsd such that the value of the pinion angle θp at that time meets the standard value θsd.

In the case of this embodiment, the offset command is input in a state where the turning state of the turning wheels 5 has been adjusted to the straight-ahead state in the turning unit 6. Thus, at the time when the turning-side control unit 60 determines whether the offset command is input, the turning wheels 5 are in the straight-ahead state. In this case, if the pinion angle θp deviates from the zero value, the standard value θsd deviates from the rack neutral position by the amount corresponding to this deviation. That the turning-side control unit 60 sets the offset value θofs in step S24 means adjusting the standard value θsd so as to meet the value of the pinion angle θp at that time.

Then, the turning-side control unit 60 determines whether the absolute value of the offset value θofs having been set in step S24 is equal to or smaller than the threshold value θth (step S25). In step S25, the turning-side control unit 60 performs determination in the same manner as in step S14 of FIG. 3. When the absolute value of the offset value θofs having been set in step S24 is equal to or smaller than the threshold value θth (step S25: YES), the turning-side control unit 60 ends the standard value adjustment process and moves to another process. In this case, the turning-side control unit 60 uses the offset value θofs having been set in step S24 for the subsequent adjustment of the standard value θsd.

On the other hand, when the absolute value of the offset value θofs having been set in step S24 is larger than the threshold value θth (step S25: NO), the turning-side control unit 60 restricts the absolute value of the offset value θofs to the threshold value θth (step S26). When going through step S26, the turning-side control unit 60 uses, for the subsequent adjustment of the standard value θsd, the offset value θofs that is obtained by restricting the absolute value of the value having been set in step S24 to the threshold value θth. Thereafter, the turning-side control unit 60 ends the standard value adjustment process and moves to another process.

Standard Value Adjustment Method

Figure 8:
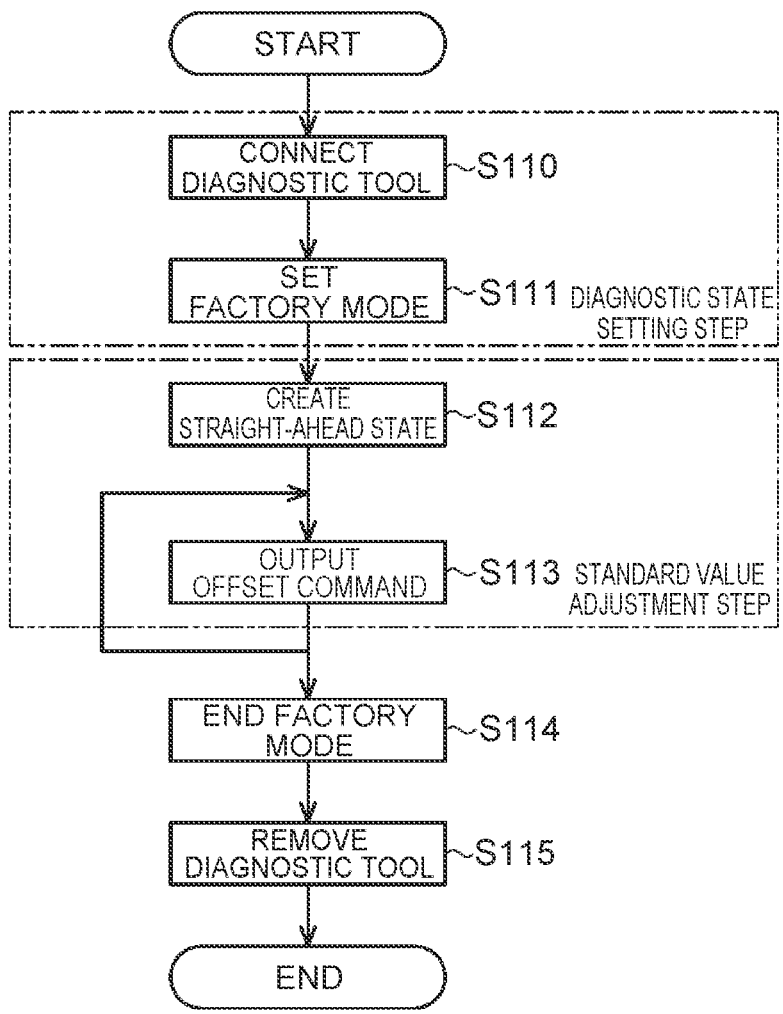
FIG. 8 is a flowchart illustrating a standard value adjustment method in the second embodiment.

As shown in FIG. 8, in the standard value adjustment method, a worker connects the diagnostic tool 45 to the vehicle, i.e., the steering control device 1 (step S110), and sets the factory mode through operation of the diagnostic tool 45 (step S111). The steps of steps S110, S111 are the same steps as steps S100, S101 of FIG. 4. Thus, the steps of steps S110, S111 correspond to the diagnostic state setting step.

Then, with the factory mode set, the worker creates the straight-ahead state of the turning wheels 5 while the vehicle is stationary (step S112). In step S112, the worker adjusts the turning state of the turning unit 6 such that the turning wheels 5 assume the straight-ahead state. For example, when the standard value θsd is a value deviating from the rack neutral position, the position of the steering wheel 3 shifts from the steering wheel neutral position toward one of the leftward and rightward steering sides as in the first embodiment.

Then, the worker outputs the offset command through operation of the diagnostic tool 45 (step S113). Operation of the worker in step S113 means adjusting the standard value θsd such that the position of the steering wheel 3 matches the steering wheel neutral position. In this embodiment, the steps of steps S112, S113 correspond to the standard value adjustment step.

Then, when the worker checks the position of the steering wheel 3 and determines that adjustment of the standard value θsd has been completed, the worker ends the factory mode through operation of the diagnostic tool 45 (step S114). Then, the worker removes the diagnostic tool 45 from the steering control device 1 (step S115) and ends the work of adjusting the standard value. The steps of steps S114, S115 are the same steps as steps S104, S105 of FIG. 4.

How Standard Value θsd is Adjusted

Figure 9:
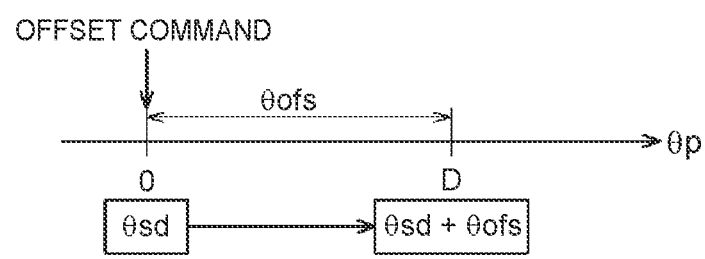
FIG. 9 is a view illustrating how the standard value is adjusted in the second embodiment.

In the one example shown in FIG. 5, the standard value θsd can be adjusted by the standard value adjustment method performed by a worker shown in FIG. 8 and through the standard value adjustment process executed by the turning-side control unit 60 shown in FIG. 9. In this case, in the standard value adjustment method, the worker outputs the offset command through operation of the diagnostic tool 45.

As shown in FIG. 9, when the offset command is input in the standard value adjustment process, the turning-side control unit 60 sets the offset value θofs to the deviation amount D. Thus, the offset value θofs matches the deviation amount D. The adjusted standard value θsd has been adjusted so as to shift toward the rightward steering side by the deviation amount D as the offset value θofs corresponding to the deviation amount D has been added thereto. Thus, the adjusted standard value θsd matches the deviation amount D that is the value of the pinion angle θp when creating the straight-ahead state of the turning wheels 5 while the vehicle is stationary, i.e., matches the rack neutral position.

In this way, when creating the straight-ahead state of the turning wheels 5 while the vehicle is stationary, the value of the pinion angle θp is calculated, using the adjusted standard value θsd, as a zero value showing that the turning wheels 5 are oriented in the direction of the solid arrows in FIG. 5. Thus, the position of the steering wheel 3 matches the steering wheel neutral position.

Advantages of Embodiment

In this embodiment, a worker can adjust the standard value θsd while the vehicle is stationary. In this case, since the vehicle is stationary, adjustment of the standard value θsd can be performed without taking into account the feedback control on the pinion angle θp being affected by adjustment of the standard value θsd. This is effective for ensuring safety of the maintenance worker and realizing high-efficiency work in adjusting the standard value θsd.

Other Embodiments

Each of the above-described embodiments may be changed as follows. The following other embodiments can be combined with each other within such a range that no technical contradiction arises.

In the first embodiment, the process of steps S14, S15 of the standard value adjustment process may be omitted. The same applies to the process of steps S25, S26 of the standard value adjustment process of the second embodiment.

In the first embodiment, the threshold value θth used in step S14 of the standard value adjustment process can be changed as appropriate, as long as it is set from the viewpoint of mitigating the discomfort caused to the driver. For example, as the threshold value θth, a value within an experimentally obtained range should be set such that a steering reaction force applied based on the turning-converted angle θp_s or the vehicle's behavior does not cause discomfort to the driver. The same applies to the second embodiment.

In the first embodiment, the offset value θofs may be calculated in a state where the turning wheels 5 have been steered to a left or right limit, instead of in the straight-ahead state of the turning wheels 5. For example, when the turning wheels 5 are in the state of being steered to the left or right limit in the one example shown in FIG. 5, the value of the pinion angle θp shifts from an original value by the deviation amount D. The same applies to the second embodiment.

In the first embodiment, the turning-side control unit 60 may be triggered by input of the offset command to set the value of the pinion angle θp at that time as the offset value θofs in step S13 of the standard value adjustment process, as in step S24 of the standard value adjustment process of the second embodiment.

In the first embodiment, steps S12, S13 of the standard value adjustment process may be realized as a process in which the turning-side control unit 60 calculates the pinion angle θp in the straight-ahead state of the turning wheels 5 and automatically updates the offset value θofs, regardless of whether the offset command is input. In this case, the step of step S103 of the standard value adjustment method can be omitted. The same applies to the process of steps S23, S24 of the standard value adjustment process of the second embodiment. In this case, the step of step S113 of the standard value adjustment method can be omitted.

In the first embodiment, in the process of step S11 of determining whether the normal turning-side control can be properly executed, this determination may be performed based on a result of diagnosis by the diagnostic tool 45. In this case, the diagnostic tool 45 should output a diagnostic result command showing a result of determining whether the normal turning-side control can be properly executed to the steering control device 1, i.e., the turning-side control unit 60. The same applies to the process of step S21 of the standard value adjustment process in the second embodiment.

In the first embodiment, a step of adjusting a toe angle of the left and right turning wheels 5 can be added to the standard value adjustment method, before the step of step S102 of making the vehicle travel. In this case, although a situation where the standard value θsd deviates from the rack neutral position due to a cause attributable to adjustment of the toe angle of the left and right turning wheels 5 is likely to arise, this situation can be appropriately responded to. The same applies to the standard value adjustment method of the second embodiment. That is, a step of adjusting the toe angle of the left and right turning wheels 5 should be added to the standard value adjustment method, before and after the step of step S112 of creating the straight-ahead state of the turning wheels 5 while the vehicle is stationary.

In the first embodiment, the vehicle may be configured such that the factory mode can be set through special operation of a worker on the vehicle or the steering control device 1. In this case, the vehicle may be configured such that the offset command can be input through special operation of a worker on the vehicle or the steering control device 1. In these cases, the diagnostic tool 45 is not required for adjusting the standard value θsd. The same applies to the second embodiment.

In the first embodiment, the unit amount may be a value that varies based on the value of the pinion angle θp in the straight-ahead state of the turning wheels 5, i.e., on the magnitude of deviation of the standard value θsd. For example, the unit amount may be a value obtained by equally dividing the value of the pinion angle θp in the straight-ahead state of the turning wheels 5 by a predetermined integer n.

In the second embodiment, the turning-side control unit 60 may be triggered by input of the offset command to update the offset value θofs by increasing or decreasing the offset value θofs by the unit amount in step S24 of the standard value adjustment process, as in step S13 of the standard value adjustment process of the first embodiment.

In each of the above-described embodiments, the standard value adjustment process may be realized as a process that the steering-side control unit 50 and the turning-side control unit 60 execute in cooperation with each other. For example, the process of steps S10, S11 may be assigned to the steering-side control unit 50, and the process of the other steps S12 to S15 may be assigned to the turning-side control unit 60. In this case, the steering-side control unit 50 and the turning-side control unit 60 correspond to the control unit. The same applies to the standard value adjustment process of the second embodiment.

In each of the above-described embodiments, the diagnostic tool 45 may be configured such that a worker can check the value of the pinion angle θp. In this case, the turning-side control unit 60 should be configured to be able to output the value of the pinion angle θp to the diagnostic tool 45 while the factory mode is set.

In each of the above-described embodiments, a notification device that notifies the driver that the factory mode is set, i.e., the standard value θsd is being adjusted may be provided inside a vehicle cabin, for example, in an instrument panel. Examples of notification action of the notification device include displaying a message by characters, issuing a message by a voice, or generating an electronic sound.

In each of the above-described embodiments, the steering angle ratio is set to an appropriate value according to the product specifications etc. For example, the steering angle ratio may be θh:θi, i.e., θh:θp being 1:1 or 1:3. In the case where θh:θp is 1:3, a 10° change in the steering angle θh is accompanied by a 30° change in the turning angle θi. In the case where θh:θp is 1:1, the turning-converted angle θp_s and the pinion angle θp basically match. In either case, unless the standard value θsd deviates from the rack neutral position, the value of the pinion angle θp in the straight-ahead state of the turning wheel 5 is the zero value.

In each of the above-described embodiments, the steering control device 1 may have one control unit that is configured to have functions integrating the function of the steering-side control unit 50 of operating the steering-side motor 13 and the function of the turning-side control unit 60 of operating the turning-side motor 32.

In each of the above-described embodiments, when calculating the target reaction force torque, the steering-side control unit 50 should at least use a state variable that changes according to the operation state of the steering wheel 3. In this case, instead of using the vehicle speed V or the steering torque Th, the steering-side control unit 50 may use other elements or may use other elements in combination.

In each of the above-described embodiments, the steering-side control unit 50 may calculate, as the target reaction force torque, a value that is calculated through execution of torque feedback control of adapting the steering torque Th to the target steering torque calculated based on the steering torque Th.

In each of the above-described embodiments, the steering-side control unit 50 may calculate the steering angle θh by taking into account torsion of the steering shaft 11 according to the steering torque Th and factoring this torsion into the rotation angle θa through addition, subtraction, etc.

In each of the above-described embodiments, as the steering angle θh, a detection result of a steering sensor that is provided on the steering shaft 11 to detect the rotation angle of the steering shaft 11 may be used.

In each of the above-described embodiments, as the pinion angle θp, a detection result of a pinion angle sensor that is provided on the pinion shaft 21 to detect the rotation angle of the pinion shaft 21 may be used. In each of the above embodiments, as the turning-side motor 32, for example, a motor disposed on the same axis as the rack shaft 22, or a motor that is connected to the pinion shaft constituting part of the rack-and-pinion mechanism on the rack shaft 22 through the worm-and-wheel may be used.

In each of the above embodiments, the steering device 2 has a link-less structure in which the steering unit 4 and the turning unit 6 are always mechanically separated from each other. However, the steering device 2 is not limited thereto and may have a structure in which the steering unit 4 and the turning unit 6 can be mechanically separated by a clutch. Further, the steering device 2 may have an independently turnable structure in which the turning unit 6 can turn the left and right turning wheels 5 independently of each other. In addition, the steering device 2 may be an electric power steering device that applies an assisting force that is a force for assisting the driver in steering operation. In this case, the pinion shaft 21 is mechanically connected to the steering wheel 3 through the steering shaft 11. The steering shaft 11 is mechanically connected to the pinion shaft 21 through a steering angle ratio variable mechanism that varies the steering angle ratio. The electric power steering device that can vary the steering angle ratio may be configured such that the standard value θsd in each of the above-described embodiments can be adjusted when feedback control is performed on the pinion angle θp. In this case, even when the same problem as in each of the above-described embodiments arises, it can be solved by applying the configuration in accordance with each of the above-described embodiments.

What is claimed is:

1. A steering control device that controls, as a target, a steering device including a turning unit that operates to turn a turning wheel of a vehicle, the steering control device comprising a control unit that stores a standard value and controls operation of the turning unit, the standard value being a value associated with a mechanical state of the turning unit showing a straight-ahead state that is a turning state of the turning wheel when the vehicle moves straight ahead, wherein:
the control unit is configured to execute a control angle calculation process, an angle feedback process, and a standard value adjustment process;
(i) the control angle calculation process is a process of calculating, as an absolute angle relative to the standard value, a control angle that is angle information showing an actual turning state of the turning wheel, (ii) the angle feedback process is a process of performing feedback control on the control angle so as to turn the turning wheel to a target turning state, and (iii) the standard value adjustment process is a process of adjusting the stored standard value while the steering control device is in a diagnostic state for diagnosing an abnormal state of the vehicle; and
the standard value adjustment process includes a process of, when the turning wheel is mechanically positioned in the straight-ahead state and the control angle deviates from a value showing the straight-ahead state, adjusting the standard value to decrease a deviation of the control angle from the value showing the straight-ahead state, the standard value adjustment process including:
obtaining an offset value by accumulating a plurality of instances of a predetermined unit amount, the predetermined unit amount having a value that is smaller than a value by which the control angle deviates from the value showing the straight-ahead state when the turning wheel is mechanically positioned in the straight-ahead state, and
adjusting the standard value stepwise by the predetermined unit amount until reaching the offset value that has been obtained.

2. The steering control device according to claim 1, wherein the standard value adjustment process-includes a process of setting sets an upper limit for an absolute value of the offset value.

3. The steering control device according to claim 1, wherein:
the control unit is configured to execute the standard value adjustment process during travel of the vehicle while the steering control device is in the diagnostic state.

4. The steering control device according to claim 1, wherein:
the control unit is configured to execute the standard value adjustment process while the vehicle is stationary while the steering control device is in the diagnostic state.

5. A standard value adjustment method for adjusting a standard value that is information stored in a control unit of a steering control device that controls, as a target, a steering device including a turning unit that operates to turn a turning wheel of a vehicle, the standard value being a value associated with a mechanical state of the turning unit showing a straight-ahead state that is a turning state of the turning wheel when the vehicle moves straight ahead, the standard value adjustment method comprising:
a diagnostic state setting step in which:
the standard value is used when the control unit calculates, as an absolute angle relative to the standard value, a control angle that is angle information showing an actual turning state of the turning wheel;
the control angle is used as a control amount when the control unit performs feedback control in controlling operation of the turning unit so as to turn the turning wheel to a target turning state; and
a diagnostic state for diagnosing an abnormal state of the vehicle is set through operation of a diagnostic tool that is connected to the vehicle from outside the vehicle; and
a standard value adjustment step in which the standard value stored in the control unit is adjusted while the steering control device is in the diagnostic state, wherein
the standard value adjustment step includes a step of, when the turning wheel is mechanically positioned in the straight-ahead state and the control angle deviates from a value showing the straight-ahead state, adjusting the standard value through operation of the diagnostic tool to decrease a deviation of the control angle from the value showing the straight-ahead state, the standard value adjustment step including:
obtaining an offset value by accumulating a plurality of instances of a predetermined unit amount, the predetermined unit amount having a value that is smaller than a value by which the control angle deviates from the value showing the straight-ahead state when the turning wheel is mechanically positioned in the straight-ahead state, and
adjusting the standard value stepwise by the predetermined unit amount until reaching the offset value that has been obtained.

* * * * *